United States Patent
Muller et al.

(10) Patent No.: US 6,779,393 B1
(45) Date of Patent: Aug. 24, 2004

(54) DEVICE FOR MEASURING THE MASS OF A FLOWING MEDIUM IN AN INTAKE TUBE

(75) Inventors: Wolfgang Muller, Rutesheim (DE); Klaus Reymann, Gerlingen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,269

(22) PCT Filed: Jul. 9, 1998

(86) PCT No.: PCT/DE98/01892
§ 371 (c)(1),
(2), (4) Date: Jul. 8, 1999

(87) PCT Pub. No.: WO99/14560
PCT Pub. Date: Mar. 25, 1999

(30) Foreign Application Priority Data

Sep. 18, 1997 (DE) .......................... 197 41 031

(51) Int. Cl.[7] .............................. G01F 1/68
(52) U.S. Cl. .................. 73/202.5; 73/118.2; 73/202
(58) Field of Search .......... 73/202.5, 204.11, 73/204.22

(56) References Cited

U.S. PATENT DOCUMENTS

| | | | | |
|---|---|---|---|---|
| 5,315,870 A | * | 5/1994 | Schwegel et al. .......... | 73/118.2 |
| 5,355,726 A | * | 10/1994 | Zurek et al. ............... | 73/118.2 |
| 5,631,415 A | * | 5/1997 | Igarashi et al. ........... | 73/118.2 |
| 5,712,425 A | * | 1/1998 | Hecht et al. ............... | 73/118.2 |
| 5,925,820 A | * | 7/1999 | Tank et al. ................ | 73/118.2 |
| 5,948,975 A | * | 9/1999 | Mueller et al. ........... | 73/118.2 |
| 6,148,663 A | * | 11/2000 | Stahl et al. ............... | 73/118.2 |
| 6,422,070 B2 | * | 7/2002 | Reymann et al. .......... | 73/118.2 |

FOREIGN PATENT DOCUMENTS

| | | |
|---|---|---|
| DE | 44 07 209 A | 9/1995 |
| EP | 0 313 089 A | 4/1989 |
| EP | 0 441 523 A | 8/1991 |
| EP | 0 588 626 A | 3/1994 |
| EP | 0 708 315 A | 4/1996 |

OTHER PUBLICATIONS

U. Konzelmann et al.: "Breakthrough in Reverse Flow Detection—A New Mass Air Flow Meter Using Micro Silicon Technology," SAE–Paper 950433; Electronic Engine Controls 1995 (SP1082), pp. 105–110, XP002084070, Warrendale, PA, US.

* cited by examiner

*Primary Examiner*—Harshad Patel
(74) *Attorney, Agent, or Firm*—Ronald E. Greigg

(57) ABSTRACT

A device for measuring the mass of a flowing medium with a temperature-dependent measurement element has a measurement conduit whose faces, which extend perpendicular to a surface fixed by the measurement element, are inclined and approach each other in the flow direction of the medium in the measurement conduit. The invention is provided for measuring the mass of a flowing medium to measure the intake air mass of internal combustion engines.

10 Claims, 3 Drawing Sheets

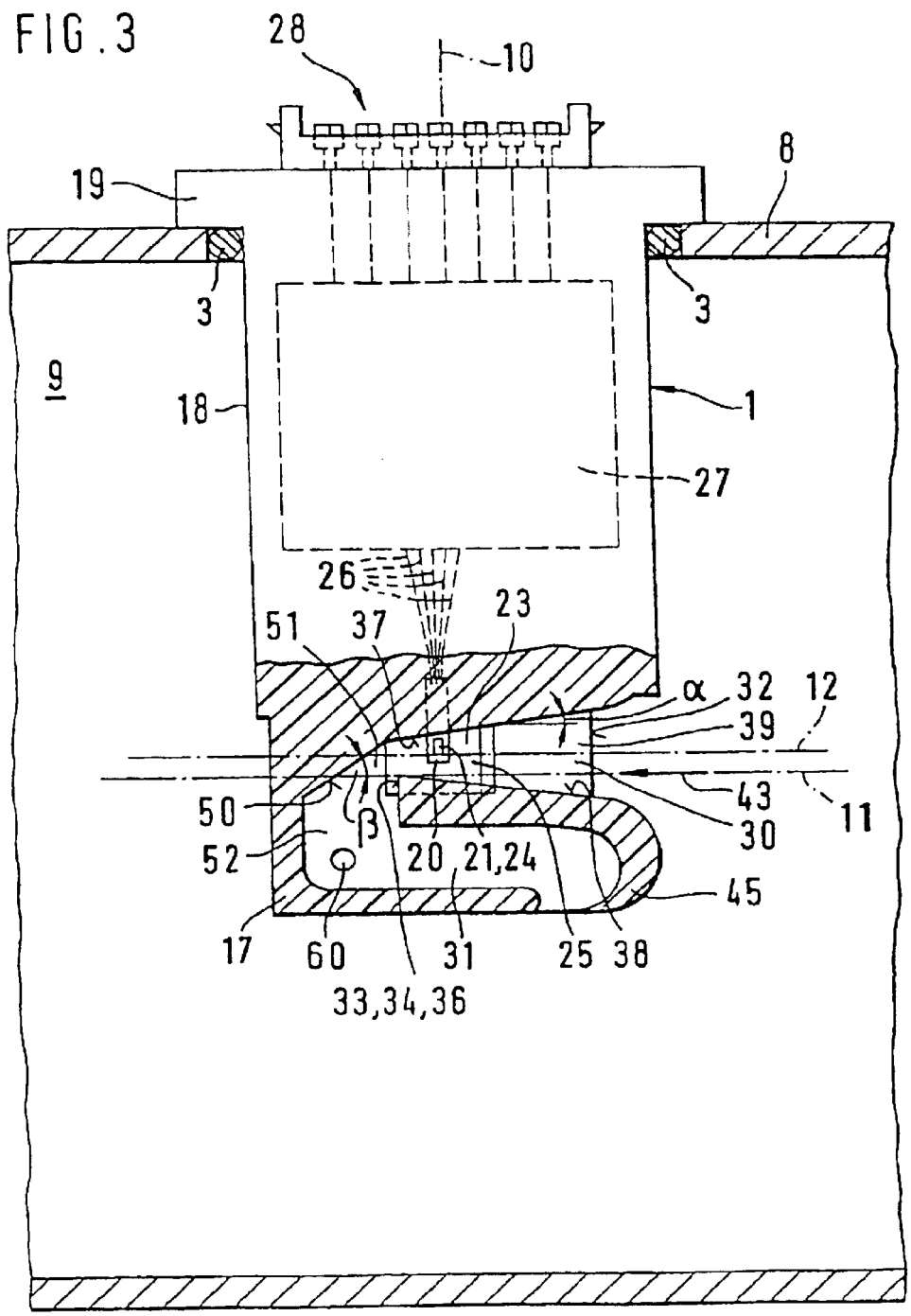

DEVICE FOR MEASURING THE MASS OF A FLOWING MEDIUM IN AN INTAKE TUBE

PRIOR ART

The invention is based on a device for measuring the mass of a flowing medium. A device has already been disclosed (DE-PS 44 07 209), which has a temperature-dependent measurement element that is accommodated in a measurement conduit that extends in a straight line. The measurement conduit extends in the device from an inlet to an outlet, which is adjoined by an S-shaped deflection conduit. The flowing medium flows from outside into the measurement conduit and then into the deflection conduit, where it flows out again from an outlet opening. The measurement conduit has a rectangular flow cross section, wherein two side faces oriented toward the platelet-shaped measurement element are embodied extending obliquely so that a tapering of the measurement conduit is produced in the flow direction of the medium in the measurement conduit. A top face of the measurement conduit, which extends lateral to the side faces and from which the measurement element protrudes, and a bottom face of the measurement conduit disposed opposite this top face thereby extend in a level or parallel fashion, with a constant distance from each other.

A device equipped with such a measurement conduit is also known from the SAE Paper 950433 (International Congress and Exposition Detroit, Mich., Feb. 27–Mar. 2, 1995, can be inferred from the sectional depiction in the top picture in FIG. 7 on page 108, the measurement conduit and the deflection conduit are essentially comprised of two parts, wherein a part referred to below as the base part, with the measurement element, includes a side face, a top face, and a bottom face of the measurement conduit and the deflection conduit. The other part has only the second side face of the measurement conduit and the deflection conduit and thus constitutes a cover part. The base part and the cover part are preferably made of plastic, for example using the plastic injection molding technique. Because of the tapering shape of the side fades of the measurement conduit, an increasing wall thickness is produced in the flow direction. In the manufacturing, it has turned out that due to the increasing wall thickness, varying cooling speeds and accumulations of material occur, which can in particular lead to hollows in the side faces of the measurement conduit. In a provided mass production of the device, this results in more or less intense variations in the achievable measurement precision of the devices.

ADVANTAGES OF THE INVENTION

The device according to the invention for measuring the mass of a flowing medium has the advantage over the prior art that in mass production, devices with a properly manufactured housing can be produced so that only extremely slight variations in the measurement precision occur. It is also particularly advantageous that by means of the embodiment, according to the invention, of the walls of the measurement conduit, an acceleration of the flow in the measurement conduit can furthermore be maintained, which leads in a known manner to a stabilization of the flow of the medium in the measurement conduit, particularly at the inlet.

Advantageous improvements and updates of the device disclosed are possible by means of the measures taken.

An inclined embodiment of an edge face of the deflection it conduit is particularly advantageous, with which it is possible to further simplify the manufacturing of the measurement conduit and the deflection conduit, wherein a further improvement of the measurement result also occurs.

Furthermore, a flow connection to the external flow in the intake line is provided in the deflection conduit in the form of an opening, by means of which possibly existing residual interferences of a pressure wave in the deflection conduit can be completely eliminated so that a further improvement of the measurement result can be achieved. Furthermore, the device has a considerably reduced measurement signal noise, which can be produced by means of turbulences that occur in the measurement conduit.

BRIEF DESCRIPTION OF THE DRAWINGS

Exemplary embodiments of the invention are shown in simplified form in the drawings and will be explained in more detail in the description that follows.

DESCRIPTION OF THE EXEMPLARY EMBODIMENTS

Figure 1:
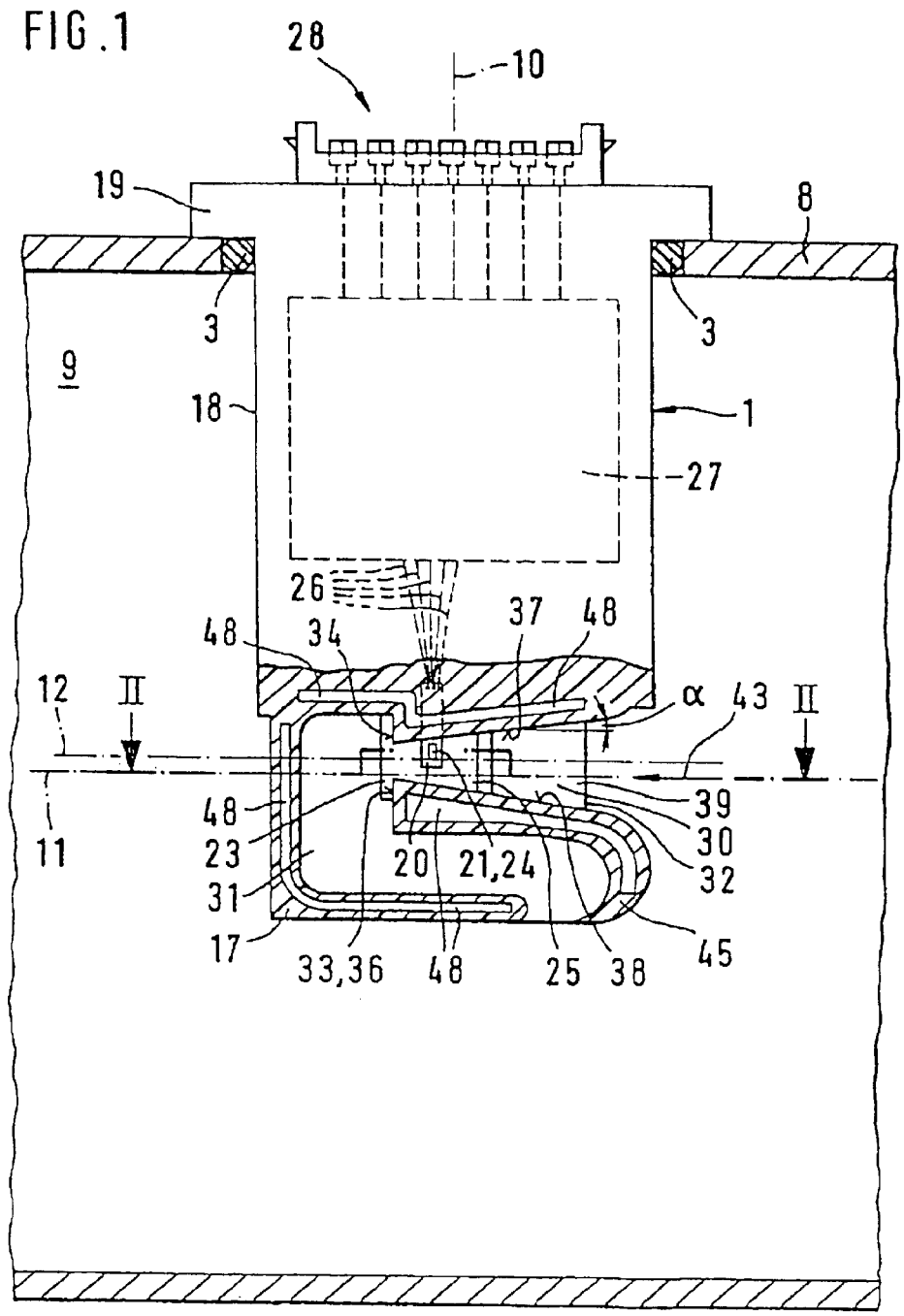
FIG. 1, in a partially sectional depiction, shows a side view of the device according to a first exemplary embodiment according to the invention.

In a partially sectional depiction, FIG. 1 shows a side view of a device labeled 1, which is used to measure the mass of a flowing medium, in particular the intake air mass of internal combustion engines. The internal combustion engine can be a mixture compressing engine with externally supplied ignition, or it can also be an air compressing, self-igniting engine. The device 1 has, for example, a narrow, rod-like, block-shaped form that extends longitudinally in the electrical direction of the plug axis 10, and is inserted into an opening let into a wall 8 of an intake line 9, for example 90 that it can be plugged in. The device 1 is sealed by means of a sealing ring 3 to an outside electrical source in the wall 8, and is connected to the wall, for example by means of a screw connection that is not shown in detail. The cross-hatched wall 8 is part of the intake line 9 that is embodied for example as cylindrical, through which the internal combustion engine can aspirate air from the environment by way of an air filter that is not shown in detail. The wall 8 of the intake line 9 defines a flow cross section that in the case of the cylindrical intake line 9, for example, has a circular cross section in the center of which a center axis 11 extends in the axial direction, parallel to the wall 8, and this axis is oriented perpendicular to the plug axis 10. With a part referred to below as the measurement part 17, the device 1 protrudes into the flowing medium, wherein the measurement part 17 is disposed, for example, approximately in the vicinity of the center of the intake line 9.

The device 1 is composed, for example, in one piece out of the measurement part 17, a support part 18, and a securing part 19, and is preferably made of plastic using the plastic injection molding technique. A measurement element 21 is embodied for example in the form of a so-called micromechanical component and has a plate-shaped, silicon-based support body 20 with an etched-out, membrane-shaped sensor region with an extremely slight thickness and a number of likewise etched-out resistive films. These resistive films constitute at least one temperature-dependent measurement resistor and for example one heating resistor. Preferably, the heating resistor is disposed in the center of the membrane and, with the aid of a temperature sensor, is regulated to an over temperature. Upstream and downstream of the heating region constituted by the heating resistor, two measurement resistors are disposed symmetrically to the heating region. A measurement element of this kind is known from the SAE Paper 950433 mentioned above, as well as from DE-OS 42 19 454, and U.S. Pat. No. 5,404,753, the disclosure of which is expressly intended to be a component of the current patent application. The support body 20 of the measurement element 21 is accommodated flush in a recess in a plate-shaped mount comprised, for example, of metal, and is secured there, for example, by means of adhesive. The individual resistive films of the measurement element 21 are electrically connected by means of connecting lines 26 that extend inside the device 1 to an electronic evaluation circuit 27 depicted with dashed lines in FIGS. 1 and 3, which includes, for example, a bridge-like resistive measurement circuit. With a plug connection 28 provided on the securing part 19, the electrical signals produced by the evaluation circuit 27 can also be supplied, for example, to another electronic control device for evaluation.

Figure 2:
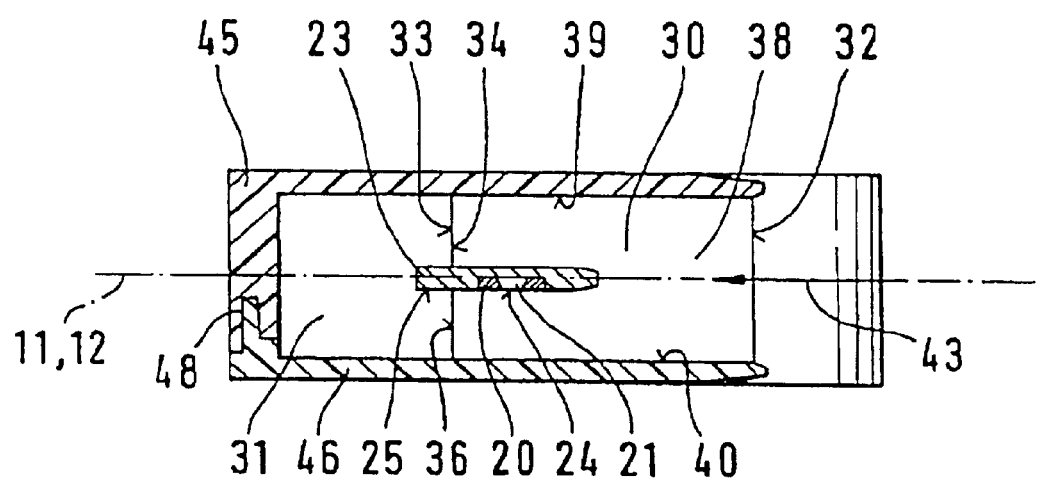
FIG. 2 is a section through the device along a line II—II in FIG. 1, FIG. 3, in a partially sectional depiction, shows a side view of the device according to a second exemplary embodiment according to the invention.

As depicted in FIGS. 1 and 2, the measurement part 17 of the device 1 has a block-shaped form and a measurement conduit 30 that extends along a measurement conduit axis 12 that extends centrally in the measurement conduit 30 from an inlet 32 with a rectangular cross section to an outlet 33 that likewise has a rectangular cross section. The device 1 is installed in the intake line 9, preferably with the measurement conduit axis 12 parallel to the center axis 11. However, it is also possible to install the device 1 with an oblique installation position, rotated around the plug axis 10. In addition to or instead of the oblique installation position, it is also conceivable to install the device 1 in a tilted installation position, inclined around the center axis 11. The measurement conduit 30 transitions downstream into an S-shaped deflection conduit 31. The measurement conduit 30 is defined by a top face 37, which is farther from the center axis 11 and is disposed above in FIGS. 1 and 3, and by a bottom face 38, which is closer to the center axis 11 and is disposed below in FIGS. 1 and 3, as well as by two side faces 39, 40, wherein only one of the side faces extending parallel to the plane of the drawing is visible in FIGS. 1 and 3, namely the side face 39. The top face 37 and the bottom face 38 extend toward each other in the direction 43 of the medium flowing in the measurement conduit 30 toward the measurement element 21, and end with a narrowest cross section at a narrowest point 36 at the outlet 33 of the measurement conduit 30, which at the same time represents an inlet 34 of the deflection conduit 31. The measurement element 21 with the resistive films has a surface 24 exposed to the flow 43 in the measurement conduit 30, which is flush with a surface 25 of the mount 23. The faces 37, 38 of the measurement conduit 30 extend in planes which and lateral to, or essentially perpendicular to the surface 24 of the plate-shaped measurement element 21, and by means of their extending toward each other as mentioned above enclose an inclination angle α, which is preferably approx. 8°.

As shown in more detail in FIG. 2, a sectional depiction along a line II—II in FIG. 1, the two side faces 39 and 40 extend approximately parallel to the surface 24 of the measurement element 21. Consequently, an axial tapering of the measurement conduit 30 in the flow direction 43 is produced only by means of the faces 37, 38 that approach each other, wherein the measurement element 21 is preferably disposed slightly upstream of the narrowest point 36 of the measurement conduit 30. The tapering of the measurement conduit 30 provided in the flow direction 43 or the constant reduction of the flow cross section from the inlet 32 to the outlet 33 has the effect that an accelerated flow is produced in the vicinity of the measurement element 21, which produces a virtually;uninterrupted, uniform parallel flow in the vicinity of the measurement element 21.

The inclined embodiment of the faces 37, 38 according to the invention, which extends perpendicular to the surface 24 of the measurement element 21, as shown in FIG. 2, produces a base part 45 that contains the side face 39 and the faces 37, 38 and a cover part 46 that is connected to the base part 45, for example in a detachable manner, wherein the thickness of the wall of the base part 45 is constant in the vicinity of the side face 39 and the thickness of the wall of the cover part 46 is constant in the vicinity of the side face 40. With the provided manufacture of the base part 45 and the cover part 46 by means of plastic injection molding, in addition to the simpler manufacture with the injection molding, the constant thickness of the walls in the vicinity of the side faces 39, 40 produces the advantage that a uniform cooling speed can be set, which assures the maintenance of a precise flatness of the faces 39 and 40. As shown in FIG. 1, the base part 45 also has, for example, a number of channel-shaped recesses 48, which are provided at least on the edge region of the measurement part 17 and in which the cover part 46 can engage by means of projections in order, for example, to lock the cover part 46 onto the base part 45 in detent fashion. The shaping of the recesses 48, particularly in the vicinity of the tapered measurement conduit 30, permits the embodiment of a uniform wall thickness, which during manufacture leads to a uniform cooling speed so that hollows or distortions in the faces 37, 38 of the measurement conduit 30 can likewise be prevented.

A second exemplary embodiment according to the invention is shown in FIG. 3, in which all parts that are the same or have the same function are depicted with the same reference numerals as in FIGS. 1 and 2. The device 1 shown in FIG. 3 has a deflection conduit 31 that is shaped in a slightly modified fashion in relation to FIG. 1 and whose edge face 50, which extends perpendicular to the plane of the drawing and belongs to a first part 51 of the deflection conduit 31 directly adjoining the measurement conduit 30, extends obliquely to the measurement conduit axis 12. Preferably, an inclination angle β that is enclosed by the measurement conduit axis 12 and the edge face 50 is approximately 45°. However, it is also possible to embody the edge face 50 with an inclination angle β that lies in a range from approx. 30° to 60°. The inclined edge face 50 is provided in order for the medium that flows from the outlet 33 of the measurement conduit 30 into the first part 51 of the deflection conduit 31 to be diverted along the edge face 50 into a second part 52, without an abrupt flow increase at a step, as is the case in the device 1 according to FIGS. 1 and 2.

In addition to a conduit contour that is easier to manufacture, the inclined embodiment of the edge face 50 advantageously also results in the fact that interferences in the flow coming from the outlet 33 of the measurement conduit 30, which can occur, for example, in the form of whorls or in the form of pressure waves, are reflected against the edge face 50. This time dependent and location dependent reflection of the interferences against the edge face 50 can almost completely prevent an influence of the electrical signal sent by the measurement element 21 due to interferences in the flow so that there is a precise measurement result of the measurement element 21. Moreover, further downstream of the edge face 50, an opening 60 can be provided in the deflection conduit 31, which, for example in the form of a bore in the base part 45, produces a connection of the flow in the deflection conduit 31 to the external flow in the intake line 9. It is also conceivable to provide this opening 60 only in the cover part 46. Naturally, there can also be a number of openings 60, for example in the base part 45 and/or in the cover part 46. By means of the at least one opening 60, the resonance chamber, which is embodied by the deflection conduit 31 and is for the outgoing pressure waves downstream of the outlet 33 of the measurement conduit 30, can be influenced in such a way that an attenuation of the pressure waves reflected against the edge face 50 occurs by means of a pressure equalization. Through the size of the cross section of the at least one opening 60, the natural frequency of the resonance chamber can be tuned to the frequency of the outgoing pressure waves in such a way that there is a further improvement of the measurement value delivered by the measurement element 21.

The foregoing relates to preferred exemplary embodiments of the invention, it being understood that other variants and embodiments thereof are possible within the spirit and scope of the invention, the latter being defined by the appended claims.

We claim:

1. A device for measuring the mass of a flowing medium, in an intake air mass of internal combustion engines, comprising a temperature-dependent measurement element that the flowing medium circulates around, said measurement element is disposed in a measurement conduit extending in the device from an inlet to an outlet, said measurement conduit is adjoined by a deflection conduit, wherein the measurement conduit has two faces (37, 38) which extend transversely to the measurement element (21), and that faces (37, 38) approach each other in a direction of the flow in the measurement conduit, the measurement conduit (30) having two additional faces (39, 40) which are disposed lateral to a surface(24) of the measurement element (21).

2. The device according to claim 1, in which the flow cross section of the measurement conduit (30) is generally rectangular and the additional faces (39, 40) extend parallel to the surface (24) of the measurement element (21).

3. The device according to claim 2, in which an inclination angle α respectively enclosed by the faces (37; 38) that approach each other and an axis (12) passing through the center of the measurement conduit (30) is approximately 8°.

4. The device according to claim 1, in which an inclination angle α respectively enclosed by the faces (37; 38) that approach each other and an axis (12) passing through the center of the to measurement conduit (30) is approximately 8°.

5. The device according to claim 1, in which the measurement conduit (30) and the deflection conduit (31) are comprised of two attachable parts, a base part (45) and a cover part (46).

6. The device according to claim 5, in which the thickness of the wall of the base part (45) and the cover part (46) is constant in the vicinity of the additional faces (39, 40) which extend parallel to the surface (24) of the measurement element (21).

7. The device according to claim 5, in which recesses (48) are provided in the base part (45), at least in the vicinity of the measurement conduit (30), which produce a constant wall thickness of the faces (37, 38) of the measurement conduit (30).

8. The device according to claim 1, in which an edge face (50) of a first part (51) of the deflection conduit (31) is embodied as inclined in relation to an axis (12) passing through the center of the measurement conduit (30).

9. The device according to claim 8, in which an inclination angle β enclosed by the edge face (50) and the axis (12) of the measurement conduit (30) lies in the range from approximately 30° to 60°.

10. The device according to claim 1, in which at least one opening (60) is provided in the deflection conduit (31), which produces a connection to the medium circulating around the device (1).

* * * * *